United States Patent
Lim

(10) Patent No.: US 8,666,548 B2
(45) Date of Patent: Mar. 4, 2014

(54) PATH PLANNING APPARATUS OF ROBOT AND METHOD THEREOF

(75) Inventor: San Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 495 days.

(21) Appl. No.: 12/654,165

(22) Filed: Dec. 11, 2009

(65) Prior Publication Data

US 2010/0174435 A1 Jul. 8, 2010

(30) Foreign Application Priority Data

Jan. 7, 2009 (KR) .................. 10-2009-0001235

(51) Int. Cl.
*G05D 1/00* (2006.01)
(52) U.S. Cl.
USPC .......................................... 700/250; 700/262
(58) Field of Classification Search
USPC ................ 700/246, 250, 253, 258, 264, 262; 701/25; 901/1
See application file for complete search history.

(56) References Cited

U.S. PATENT DOCUMENTS

| | | | |
|---|---|---|---|
| 6,917,855 B2 * | 7/2005 | Gonzalez-Banos et al. | 700/245 |
| 6,934,615 B2 * | 8/2005 | Flann et al. | 701/50 |
| 6,941,191 B2 * | 9/2005 | Jaeger | 700/245 |
| 7,211,980 B1 * | 5/2007 | Bruemmer et al. | 318/587 |
| 8,116,908 B2 * | 2/2012 | Ng-Thow-Hing et al. | 700/245 |
| 2002/0059213 A1 * | 5/2002 | Soga | 707/3 |
| 2004/0073368 A1 * | 4/2004 | Gonzalez-Banos et al. | 701/301 |
| 2005/0216181 A1 * | 9/2005 | Estkowski et al. | 701/200 |
| 2007/0094174 A1 * | 4/2007 | Hamadi et al. | 706/19 |
| 2008/0306628 A1 * | 12/2008 | Ng-Thow-Hing et al. | 700/245 |
| 2010/0168950 A1 * | 7/2010 | Nagano | 701/25 |

* cited by examiner

*Primary Examiner* — Jason Holloway
(74) *Attorney, Agent, or Firm* — Staas & Halsey LLP

(57) ABSTRACT

Disclosed are a path planning apparatus of a robot, which generates a path plan to control movements of the robot, and a method thereof. An improved RRT algorithm is employed, when a tree is extended in a configuration space so as to satisfy a constraint, and thus steeply bent or roundabout portions of the tree are reduced.

12 Claims, 13 Drawing Sheets

Prior Art

Prior Art

Prior Art

Prior Art

Prior Art

PATH PLANNING APPARATUS OF ROBOT AND METHOD THEREOF

CROSS-REFERENCE TO RELATED APPLICATIONS

This application claims the benefit of Korean Patent Application No. 2009-0001235, filed Jan. 7, 2009, in the Korean Intellectual Property Office, the disclosure of which is incorporated herein by reference.

BACKGROUND

1. Field

The present invention relates to a path planning apparatus of a robot and a method thereof, and more particularly to a path planning apparatus of a robot, in which a path planning algorithm to control the movement of the robot is improved, and a method thereof.

2. Description of the Related Art

Robots are machines, which automatically perform work or manipulation of objects, and are used to assist humans in various fields. There are many types of robots, such as a humanoid robot, a mobile robot, an industrial robot, an operating robot, etc.

It is important to control motions of a robot to perform a duty or service given to the robot. A technique to treat the motions of the robot is fundamentally based on a path planning algorithm. In the field of robotics, path planning is also referred to as motion planning.

As the path planning algorithm, a rapidly-exploring random tree (RRT) algorithm is generally used if a degree of freedom is high or there is a complicated constraint.

The conventional RRT algorithm makes a tree using random search in a configuration space (hereinafter, referred to as a C-space).

As shown in FIG. 1, the conventional RRT algorithm is an algorithm, which is visualized as a tree T, in which a robot or a configuration of its components is expressed by one point in a C-space, and a path satisfying a constraint is searched from an initial configuration qinit to a final configuration q. Here, the extension of the tree T is achieved by repeating a process, in which a node qnear out of nodes included in the tree T, being the nearest to a configuration q, randomly sampled in the C-space, is selected and a new node qnew, separated from the nearest node qnear by a designated distance d, is selected. Now, the extension of the tree T will be described in detail.

With reference to FIG. 2A, for a tree 1 T1, to reach a final configuration G from an initial configuration qinit while avoiding a space K not satisfying the constraint of the C-space is generated, a node qnear, being the nearest to a sampled configuration q, is selected and is connected to the sampled configuration q, thus extending the tree 1 T1. Thereafter, as shown in FIG. 2B, the node qnear, being the nearest to a sampled configuration q, is connected to the sampled configuration q, thus extending a tree 2 T2. In the same manner, as shown in FIG. 2C, a node qnear, being the nearest to a sampled configuration q, is connected to the sampled configuration q, thus extending a tree 3 T3. When a tree 4 T4 is extended by connecting a node qnear', being the nearest to a sampled configuration q, with the sampled configuration q and sequentially including a node qnew', separated from the nearest node qnear' by a designated distance d, in the fourth tree T4, as shown in FIG. 2D, the new node qnew' is selected from a line connecting the nearest node qnear' and the randomly sampled configuration q. Therefore, when the new node qnew' is separated from the nearest node qnear by the designated distance d is located in a space K not satisfying the constraint, the extension of the tree 4 T4 toward the sampled configuration q is stopped and new sampling is performed again. Such a conventional RRT algorithm generates a path while extending the tree to satisfy the constraint.

However, since in the conventional RRT algorithm, the tree is extended by selecting the nearest node qnear only in consideration of distance, most edges of the tree are stretched in a shape close to a perpendicular line and thus the generated tree may be formed in a zigzag shape or excessively detour. The result is that the traveling distance of the robot is elongated or steeply curved portions are increased.

In order to apply the conventional RRT algorithm to a robot requiring simple, smooth, and natural movements, an additional process of smoothing a path generated from the RRT algorithm is required.

SUMMARY

Therefore, one aspect of the invention is to provide a path planning apparatus of a robot, which allows the robot to move simply, smoothly, and naturally, and a method thereof.

Additional aspects and/or advantages will be set forth in part in the description which follows and, in part, will be apparent from the description, or may be learned by practice of the invention.

The foregoing and/or other aspects of the present invention are achieved by providing a path planning apparatus of a robot including a path plan generating unit to generate a tree such that edges of the tree are gently spread in a configuration space, and thus complete a path plan; and a robot control unit to control movements of the robot according to the path plan.

The path plan generating unit may select a new node to extend the tree according to a relationship between distance and angle with a sample configuration.

The path plan generating unit may select one node, in which the total sum of weights of functions of the distance and the angle is a minimum, of the nodes belonging to the tree as the nearest node.

The path plan generating unit may perform the selection of the nearest node by the following expression, $$q_{near} = \underset{Node(i) \in Tree}{\operatorname{argmin}} \{W_i |Node(i) - Sample| + (1 - W_i) f(Angle(Node(i), Sample, Tree))\}$$

where, Node(i) is an ith node belonging to the tree, Tree is a tree made up to the current time, Sample is a configuration, which is randomly sampled, |Node(i)−Sample| is a distance between the ith node and the randomly sampled configuration, Wi is a distance weight, (1-Wi) is an angle-related weight, Angle(Node, Sample, Tree) is a function defining an angle formed by the tree and an edge connecting the node and the sample, and f(Angle) is an angle-related function.

The path plan generating unit may select one node, in which the multiplication of functions of the distance and the angle is minimum, of the nodes belonging to the tree as the nearest node.

The path plan generating unit may perform the selection of the nearest node by the following expression, $$q_{near} = \underset{Node(i) \in Tree}{\mathrm{argmin}} \{|Node(i) - Sample| \times f(Angle(Node(i), Sample, Tree))\}$$

Where Node(i) is an ith node belonging to the tree, Tree is a tree made up to the current time, Sample is a configuration, which is randomly sampled, |Node(i)−Sample| is a distance between the ith node and the randomly sampled configuration, Angle(Node, Sample, Tree) is a function defining an angle formed by the tree and an edge connecting the node and the sample, and f(Angle) is an angle-related function.

The angle-related function may have the minimum value at a desired angle and is increased as being distant from the desired angle.

The foregoing and/or other aspects of the present invention are achieved by providing a path planning method of a robot including generating a tree such that edges of the tree are gently spread in a configuration space to complete a path plan; and controlling movements of the robot according to the path plan.

The generation of the path plan having the gentle edges may include selecting a new node to extend the tree according to the relationship between distance and angle with a sampled configuration.

One node, in which the total sum of weights of functions of the distance and the angle is minimum, of the nodes belonging to the tree may be selected as the nearest node.

One node, in which the multiplication of functions of the distance and the angle is minimum, of the nodes belonging to the tree may be selected as the nearest node.

The angle may be an angle formed by a vector from one node belonging to the tree to the sampled node and a vector from a parent node of the one node to the one node.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION

Figure 1:
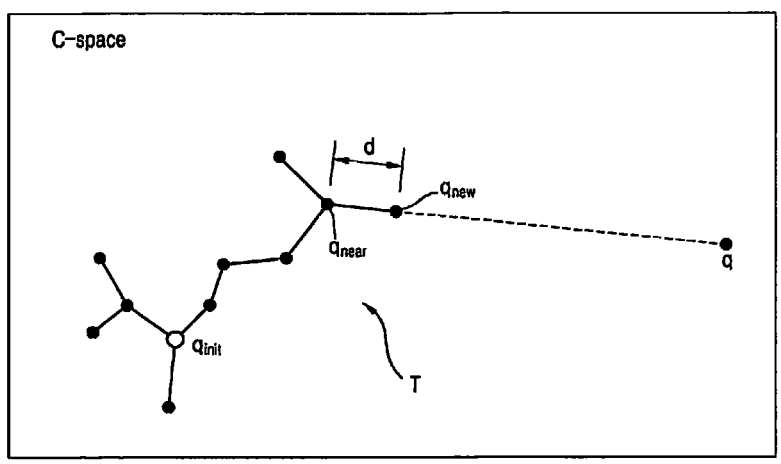
FIG. 1 is a view visualizing a tree made using a conventional RRT algorithm.
Figure 2A:
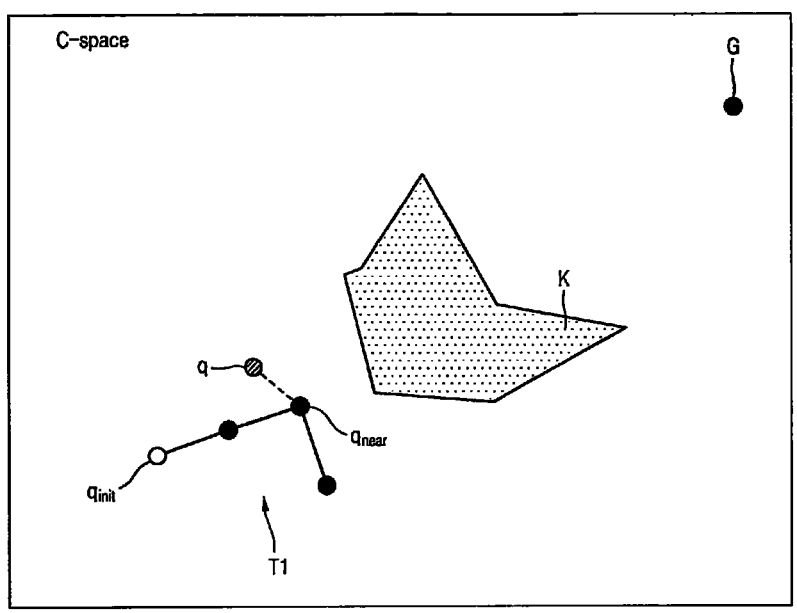
FIGS. 2A to 2D are views visualizing a process of making the tree according to the conventional RRT algorithm.
Figure 2B:
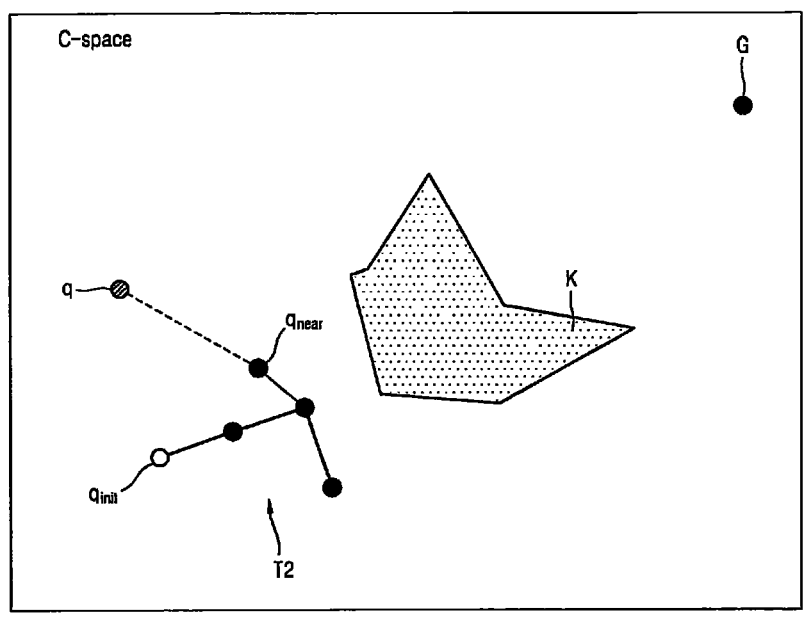
Figure 2C:
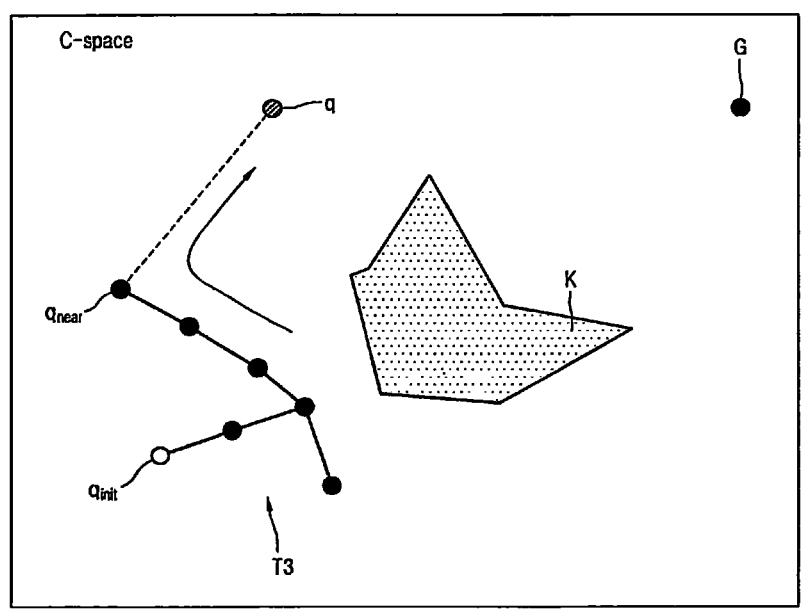
Figure 2D:
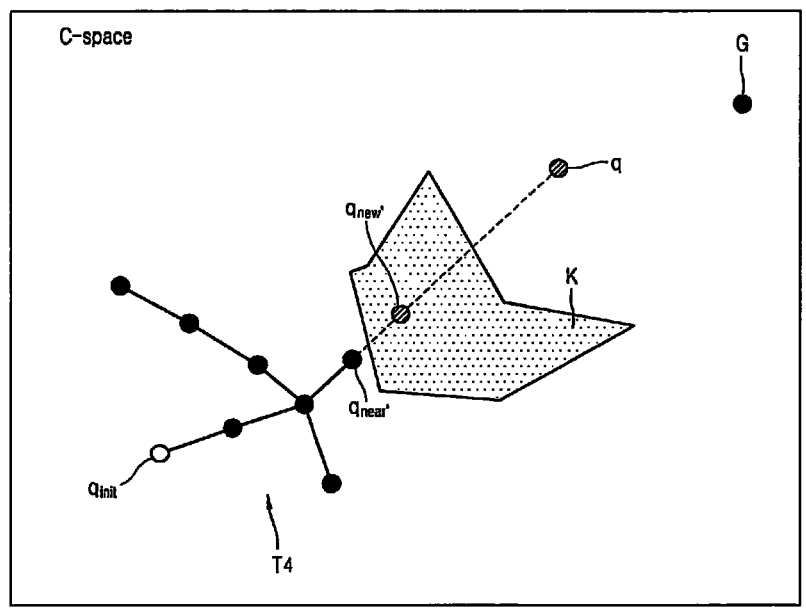

Reference will now be made in detail to the embodiment of the present invention, an example of which is illustrated in the accompanying drawings, wherein like reference numerals refer to like elements throughout. The embodiment is described below to explain the present invention by referring to the annexed drawings.

Figure 3:
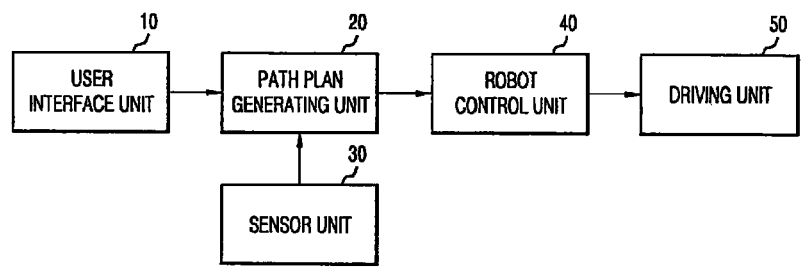
FIG. 3 is a block diagram of a path planning apparatus of a robot in accordance with an embodiment of the present invention.

FIG. 3 is a block diagram of a path planning apparatus of a robot in accordance with an embodiment of the present invention.

A user interface unit 10 provides an interface for conversation between a human being and the robot, and gives instructions through a voice as well as using a manipulation switch.

A path plan generating unit 20 generates a path plan to control motions of the robot according to user's instructions provided from the user interface unit 10, and provides the path plan to a robot control unit 40. A sensor unit 30 provides sensor data, obtained by recognizing the surrounding environment around the robot, to the path plan generating unit 20, and the sensor data forms the basis to generate the path plan.

The robot control unit 40 controls a driving unit 50 according to the received path plan, and drives elements, such as actuators, motors, etc., mounted on the robot, thus controlling the movement of the robot.

In accordance with one embodiment of the present invention, the path plan generating unit 20 generates a tree using an improved RRT algorithm.

Figure 4:
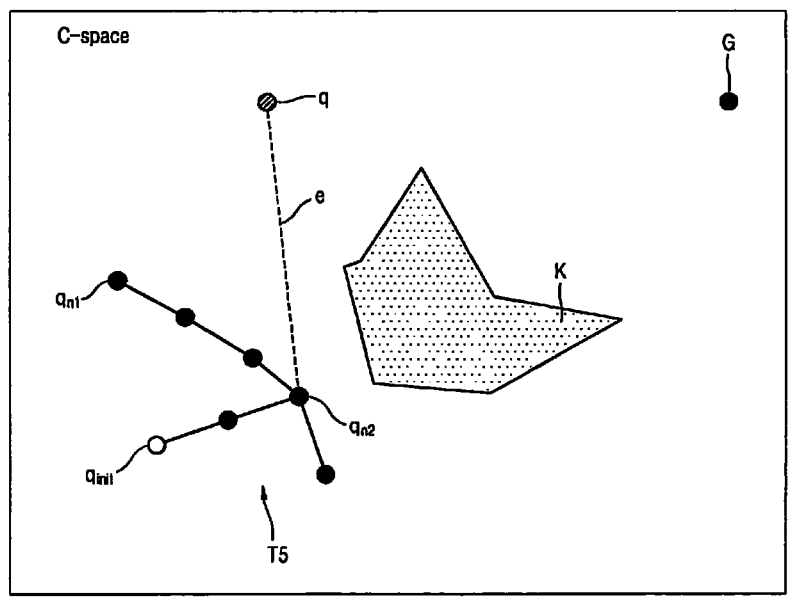
FIG. 4 is a view visualizing a tree made using an improved RRT algorithm in accordance with the embodiment of the present invention.

With reference to FIG. 4, a tree 5 T5 should be extended in a C-space while avoiding a space K not satisfying the constraint of the C-space. Here, the improved RRT algorithm is the same as the conventional RRT algorithm in that random search is used to extend the tree 5T5. However, in the improved RRT algorithm, a node being the nearest to a randomly sampled configuration q, is selected by a method that is different from that of the conventional RRT algorithm.

In accordance with the conventional RRT algorithm, a node 1 qn1 being nearest to the randomly sampled configuration q is selected as the nearest node qnear. This selection is represented by the expression 1.

$$q_{near} = \underset{Node(i) \in Tree}{\mathrm{argmin}} |Node(i) - Sample| \qquad \text{Expression 1}$$

Here, Node(i) is an ith node belonging to the tree, Tree is a tree made up to the current time, Sample is a configuration q, which is randomly sampled, and |Node(i)−Sample| is a distance between the ith node belonging to the tree and the sampled configuration q.

In accordance with the improved RRT algorithm applied to an embodiment of the present invention, a node 2 qn2 is selected as the nearest node in consideration of distance and angle with a randomly sampled configuration q, and a new node is selected from a line e connecting the sampled configuration q and the node 2 qn2. Hereinafter, this selection will be described in detail.

Figure 5:
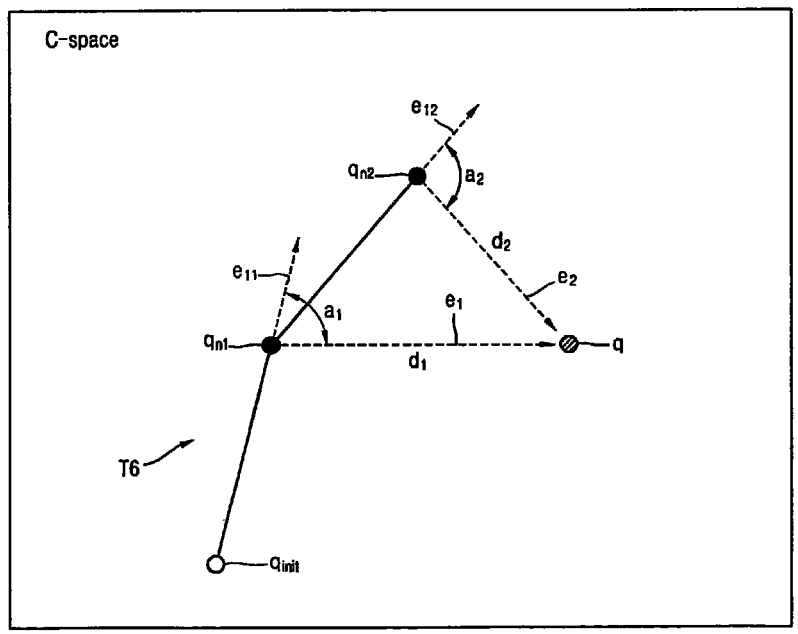
FIG. 5 is a view visualizing a process of making the tree in consideration of distance and angle in the improved RRT algorithm in accordance with the embodiment of the present invention.

FIG. 5 is a view visualizing a process of making a tree in consideration of distance and angle in the improved RRT algorithm in accordance with an embodiment of the present invention.

As shown in FIG. 5, a tree 6 T6 in a C-space includes an initial configuration qinit, a node 1 qn1, and another node 2 qn2. The node 1 qn1 is connected directly to the initial configuration qinit, and the node 2 qn2 is connected to the initial configuration qinit through the node 1 qn1. Here, it is determined which node of the node 1 qn1 and the node 2 qn2 belonging to the current tree 6 T6 is suitable for the nearest node qnear corresponding to a sampled configuration q to extend the tree 6 T6. That is, the selection of the nearest node is achieved in consideration of distances between target nodes and a sampled node and angles formed by vectors coming from the target nodes to the sampled node and vectors coming from parent nodes of the target nodes to the target nodes.

That is, a distance d1 between the node 1 qn1 and the sampled node q, a distance d2 between the node 2 qn2 and the sampled node q, an angle a1 formed by a vector e1 coming from the node 1 qn1 to the sampled node q and a vector e11 coming from the parent node qinit of the node 1 qn1 to the node 1 qn1, and an angle a2 formed by a vector e2 coming from the node 2 qn2 to the sampled node q and a vector e12 coming from the parent node qn1 of the node 2 qn2 to the node 2 qn2 are considered. Among the two nodes, a node having a short distance and a small angle is selected. Here, different desired weights may be applied to a distance item and an angle-related item.

This selection is represented by the expression 2.

$$q_{near} = \underset{Node(i) \in Tree}{\operatorname{argmin}} \{W_i |Node(i) - Sample| + (1 - W_i) f(Angle(Node(i), Sample, Tree))\} \quad \text{Expression 2}$$

Here, Node(i) is an ith node belonging to the tree, Tree is a tree made up to the current time, Sample is a configuration q, which is randomly sampled, |Node(i)−Sample| is a distance between the ith node and the sampled configuration q, Wi is a distance weight, (1-Wi) is an angle-related weight, Angle (Node, Sample, Tree) is a function defining an angle formed by the tree and an edge connecting the node and the sample, and f(Angle) is an angle-related function. An angle minimizing a target function is varied according to the defining method of f(Angle), and structure and shape of the tree are determined thereby.

In the above-described expression 2, among target nodes belonging to the tree, a node, in which the total sum of a distance item and an angle-related item is relatively small, is selected as the nearest node.

In accordance with another embodiment of the present invention, among target nodes, a node, in which a resultant value of the multiplication of a distance item and an angle-related item is relatively small, is selected as the nearest node. This selection is represented by the expression 3.

$$q_{near} = \underset{Node(i) \in Tree}{\operatorname{argmin}} \{|Node(i) - Sample| + f(Angle(Node(i), Sample, Tree))\} \quad \text{Expression 3}$$

Various examples to select the nearest node according to the angle-related function f(Angle) in the expressions 2 and 3 are shown.

Figure 6:
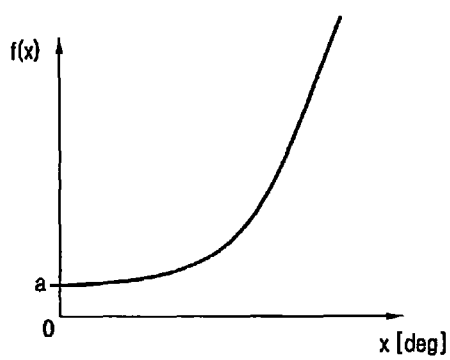
FIG. 6 is a graph representing an angle-related function in accordance with the embodiment of the present invention.

For example, as shown in FIG. 6, the angle-related function f(x) may be defined as a curve, which is larger than a constant a and is increased according to an increase of an angle x, as follows.

$$f(x) = -\cos x + a$$

Figure 7A:
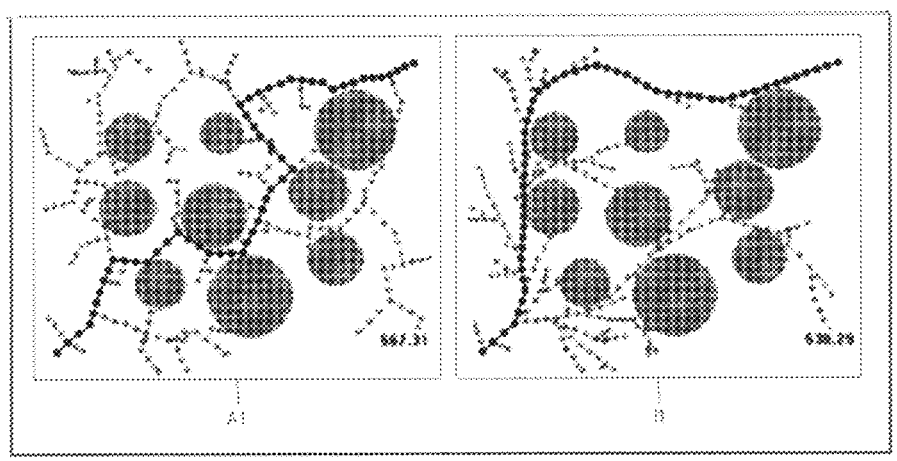
FIGS. 7A to 7C are views illustrating trees respectively made by simulation using the conventional RRT algorithm and the improved RRT algorithm applied to the embodiment of the present invention.
Figure 7B:
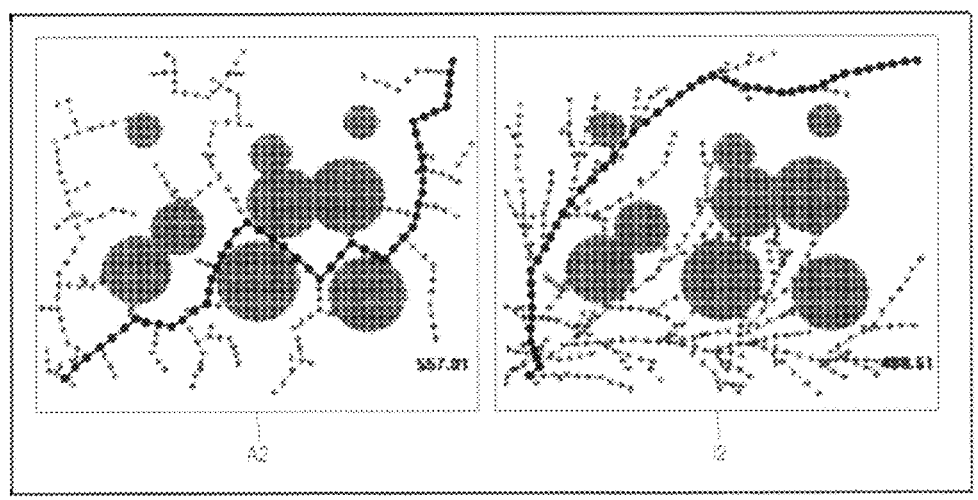
Figure 7C:
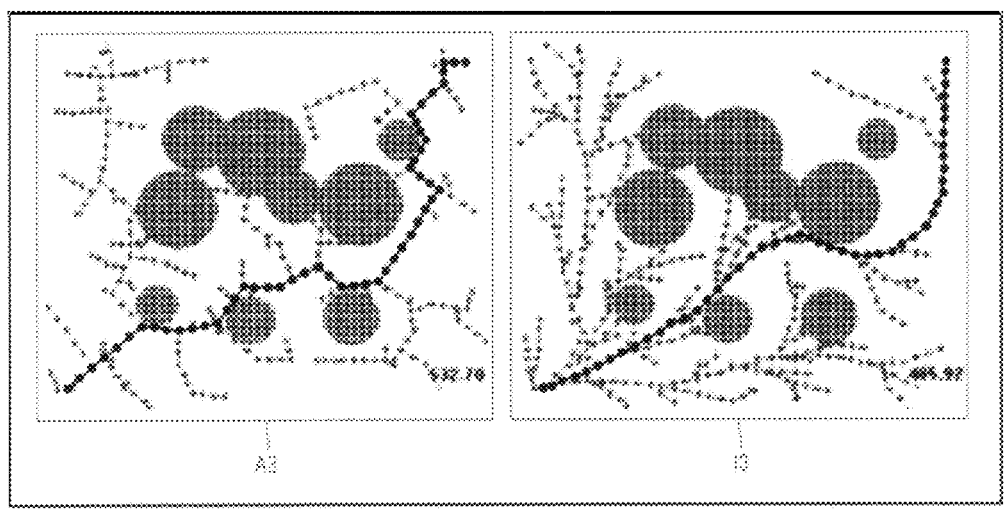

With reference to FIGS. 7A to 7C, trees A1, A2, and A3 are trees, to which the conventional RRT algorithm is applied, and trees I1, I2, and I3 are trees, to which the improved RRT algorithm of the embodiment of the present invention is applied. Here, circles represents regions, which do not satisfy the constraint, thick points and lines respectively represent nodes and paths, which are finally employed, and numbers represent the total distances from initial configurations and final configurations. It is appreciated that regions, each having a short and steeply bent path, in the trees I1, I2, and I3, to which the improved RRT algorithm of the embodiment of the present invention is applied, are remarkably reduced, as compared with the trees A1, A2, and A3, to which the conventional RRT algorithm is applied.

Figure 8:
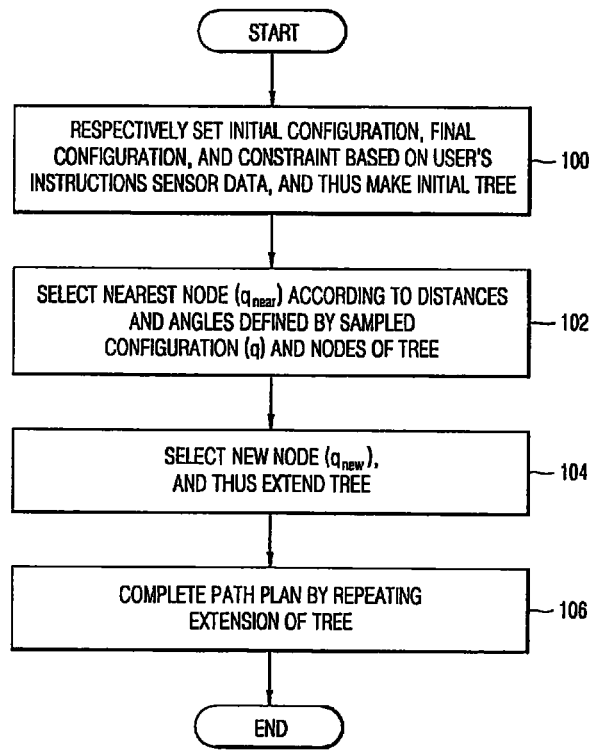
FIG. 8 is a flow chart for illustrating a path planning method of a robot in accordance with the embodiment of the present invention.

FIG. 8 is a flow chart illustrating a path planning method of a robot in accordance with the embodiment of the present invention.

The user interface unit 10 provides user's instructions, which generate a path plan to allow the robot to perform a duty or service given to the robot, to the path plan generating unit 20. The path plan generating unit 20 respectively sets an initial configuration qinit, a final configuration G, and a constraint in a C-space based on the user's instructions and sensor data provided from the sensor unit 30, and thus makes an initial tree (operation 100).

Thereafter, the nearest node qnear is selected according to distances and angles defined by a configuration q, which is randomly sampled, and nodes belonging to the tree (operation 102). Here, the expression 2 or 3 is applied to select the nearest node qnear. However, the embodiment of the present invention is not limited thereto, but other various methods in consideration of distance items and angle-related items may be applied to select the nearest node qnear.

When the nearest node qnear is selected, the sampled configuration q and the nearest node qnear is connected by a line, and a new node qnew, satisfying a designated distance on the line, is selected, thus extending the tree (operation 104). Here, the tree is extended in the C-space while avoiding a space K not satisfying the constraint of the C-space.

Thereafter, the extension of the tree is repeated until the tree reaches the final configuration G, thus completing the path plan (operation 106). Thereafter, the robot control unit 40 controls the driving unit 50 according to the generated path plan, thus controlling the movement of the robot.

When the improved RRT algorithm in accordance with the embodiment of the present invention is applied to a mobile robot, the traveling distance of the robot can be shortened and the robot can perform smooth movements. Further, when the improved RRT algorithm in accordance with the embodiment of the present invention is applied to a motion plan of a manipulator, the manipulator can perform simple and smooth movements. Moreover, when the improved RRT algorithm in accordance with the embodiment of the present invention is applied to a humanoid robot or the generation of movements of characters in animation, the humanoid robot or the characters in animation can perform smooth and natural movements.

As apparent from the above description, the embodiment of the present invention may reduce steeply bent or roundabout portions of a generated tree, and thus be applied to a robot requiring smooth and natural movements.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A path planning apparatus of a robot, comprising:
   a path plan generating unit configured to form a tree within a configuration space having information about an initial configuration and a final configuration, randomly sample a configuration in the configuration space, select, from a plurality of target nodes of the tree, a nearest node nearest to the sampled configuration in consideration of a distance and an angle between each of the plurality of target nodes and the sampled configuration, select a new node on a line connecting the nearest node and the sampled configuration, add the new node to the tree, and thus complete a path plan from the initial configuration to the final configuration; and a robot control unit configured to control movements of the robot according to the path plan, wherein the angle is an angle formed by a vector from the selected node to the sampled configuration and a vector from a parent node of the selected node to the selected node.

2. The path planning apparatus according to claim 1, wherein the path plan generating unit selects as the nearest node a node in which the total sum of weights of functions of the distance and the angle is minimum.

3. The path planning apparatus according to claim 2, wherein the path plan generating unit performs the selection of the nearest node by the following expression, $$q_{near} = \underset{Node(i) \in Tree}{\operatorname{argmin}} \{W_i |Node(i) - Sample| + (1 - W_i) f(Angle(Node(i), Sample, Tree))\}$$

where, Node(i) is an ith node belonging to the tree, Tree is a tree made up to the current time, Sample is the sampled configuration, |Node(i)−Sample| is a distance between the ith node and the sampled configuration, Wi is a distance weight, (1-Wi) is an angle-related weight, Angle(Node, Sample, Tree) is a function defining an angle formed by the tree and an edge connecting the ith node and the sampled configuration, and f(Angle) is an angle-related function.

4. The path planning apparatus according to claim 1, wherein the path plan generating unit selects as the nearest node a node in which the multiplication of functions of the distance and the angle is minimum.

5. The path planning apparatus according to claim 4, wherein the path plan generating unit performs the selection of the nearest node by the following expression, $$q_{near} = \underset{Node(i) \in Tree}{\operatorname{argmin}} \{|Node(i) - Sample| \times f(Angle(Node(i), Sample, Tree))\}$$

where, Node(i) is an ith node belonging to the tree, Tree is a tree made up to the current time, Sample is the sampled configuration, |Node(i)−Sample| is a distance between the ith node and the sampled configuration, Angle(Node, Sample, Tree) is a function defining an angle formed by the tree and an edge connecting the ith node and the sampled configuration, and f(Angle) is an angle-related function.

6. The path planning apparatus according to claim 3, wherein the path plan generating unit defines the angle-related function f(x) by the following expression, $$f(x) = -\cos(x) + a$$

where, x is an angle formed by the tree and an edge connecting the ith node and the sampled configuration, and a is a constant.

7. A path planning method of a robot comprising:
forming a tree within a configuration space having information about an initial configuration and a final configuration;
randomly sampling a configuration in the configuration space;
selecting, from a plurality of target nodes of the tree, a nearest node nearest to the sampled configuration in consideration of a distance and an angle between each of the plurality of target nodes and the sampled configuration;
selecting a new node on a line connecting the nearest node and the sampled configuration;
adding the new node to the tree to complete a path plan from the initial configuration to the final configuration; and
controlling, using a robot control unit, movements of the robot according to the path plan,
wherein the angle is an angle formed by a vector from the selected node to the sampled configuration and a vector from a parent node of the selected node to the selected node.

8. The path planning method according to claim 7, wherein selecting the nearest node comprises selecting one of the plurality of target nodes in which the total sum of weights of functions of the distance and the angle is minimum.

9. The path planning method according to claim 7, wherein selecting the nearest node comprises selecting one of the plurality of target nodes in which the multiplication of functions of the distance and the angle is minimum.

10. The path planning apparatus according to claim 5, wherein the path plan generating unit defines the angle-related function f(x) by the following expression, $$f(x) = -\cos(x) + a$$

where, x is an angle formed by the tree and an edge connecting the ith node and the sampled configuration, and a is a constant.

11. The path planning method according to claim 7, wherein determining the nearest node is performed by the following expression, $$q_{near} = \underset{Node(i) \in Tree}{\operatorname{argmin}} \{W_i |Node(i) - Sample| + (1 - W_i) f(Angle(Node(i), Sample, Tree))\}$$

where, Node(i) is an ith node belonging to the tree, Tree is a tree made up to the current time, Sample is the sampled configuration, |Node(i)−Sample| is a distance between the ith node and the sampled configuration, Wi is a distance weight, (1-Wi) is an angle-related weight, Angle(Node, Sample, Tree) is a function defining an angle formed by the tree and an edge connecting the ith node and the sampled configuration, and f(Angle) is an angle-related function.

12. The path planning method according to claim 7, wherein determining the nearest mode is performed by the following expression, $$q_{near} = \underset{Node(i) \in Tree}{\operatorname{argmin}} \{|Node(i) - Sample| \times f(Angle(Node(i), Sample, Tree))\}$$

where, Node(i) is an ith node belonging to the tree, Tree is a tree made up to the current time, Sample is the sampled configuration, |Node(i)−Sample| is a distance between the ith node and the sampled configuration, Angle(Node, Sample, Tree) is a function defining an angle formed by the tree and an edge connecting the ith node and the sampled configuration, and f(Angle) is an angle-related function.

* * * * *

UNITED STATES PATENT AND TRADEMARK OFFICE
CERTIFICATE OF CORRECTION

PATENT NO.        : 8,666,548 B2                                        Page 1 of 1
APPLICATION NO.   : 12/654165
DATED             : March 4, 2014
INVENTOR(S)       : Lim It is certified that error appears in the above-identified patent and that said Letters Patent is hereby corrected as shown below:

In the Claims

Column 8, Line 58, In Claim 12, delete "mode" and insert -- node --, therefor.

Signed and Sealed this
First Day of July, 2014

Michelle K. Lee
*Deputy Director of the United States Patent and Trademark Office*